(12) United States Patent
Ryaboy et al.

(10) Patent No.: US 9,086,112 B2
(45) Date of Patent: Jul. 21, 2015

(54) INSTRUMENTED PLATFORM FOR VIBRATION-SENSITIVE EQUIPMENT

(71) Applicants: Vyacheslav M. Ryaboy, Irvine, CA (US); Warren Booth, Laguna Hills, CA (US)

(72) Inventors: Vyacheslav M. Ryaboy, Irvine, CA (US); Warren Booth, Laguna Hills, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 14/328,188

(22) Filed: Jul. 10, 2014

(65) Prior Publication Data

US 2014/0319313 A1  Oct. 30, 2014

(51) Int. Cl.
*F16M 11/00* (2006.01)
*F16F 15/02* (2006.01)
*F16F 7/10* (2006.01)

(52) U.S. Cl.
CPC .............. *F16F 15/02* (2013.01); *F16F 7/1011* (2013.01)

(58) Field of Classification Search
USPC ............ 248/638, 678, 559, 550; 73/663, 664, 73/666, 668; 108/57.12
See application file for complete search history.

(56) References Cited

U.S. PATENT DOCUMENTS

| 4,083,433 | A  | * | 4/1978  | Geohegan et al. | ............ 188/382 |
| 5,170,104 | A  | * | 12/1992 | Laughlin        | ........................ 318/135 |
| 5,912,442 | A  | * | 6/1999  | Nye et al.      | ...................... 181/292 |
| 6,202,492 | B1 | * | 3/2001  | Ohsaki          | ............................ 73/662 |
| 6,220,100 | B1 | * | 4/2001  | Felkins et al.  | .................. 73/663 |
| 6,511,035 | B1 | * | 1/2003  | Teel et al.     | ...................... 248/550 |

* cited by examiner

*Primary Examiner* — Steven Marsh
(74) *Attorney, Agent, or Firm* — Brian F. Swienton

(57) ABSTRACT

A platform that includes a vibration sensor located within an inner core of a table. The table may have a first plate that supports a vibration-sensitive payload. The first plate may be separated from a second plate by the inner core. The sensor can be located within the core directly below the device. The sensor can be connected to an electrical connector attached to an external surface of the table. A monitor can be readily plugged into the electrical connector to obtain vibration data from the sensor. The platform may also include a damper located within the inner core to reduce vibration of the table. The damper may be an active device that is connected to control circuits located within, or outside, the inner core.

6 Claims, 5 Drawing Sheets

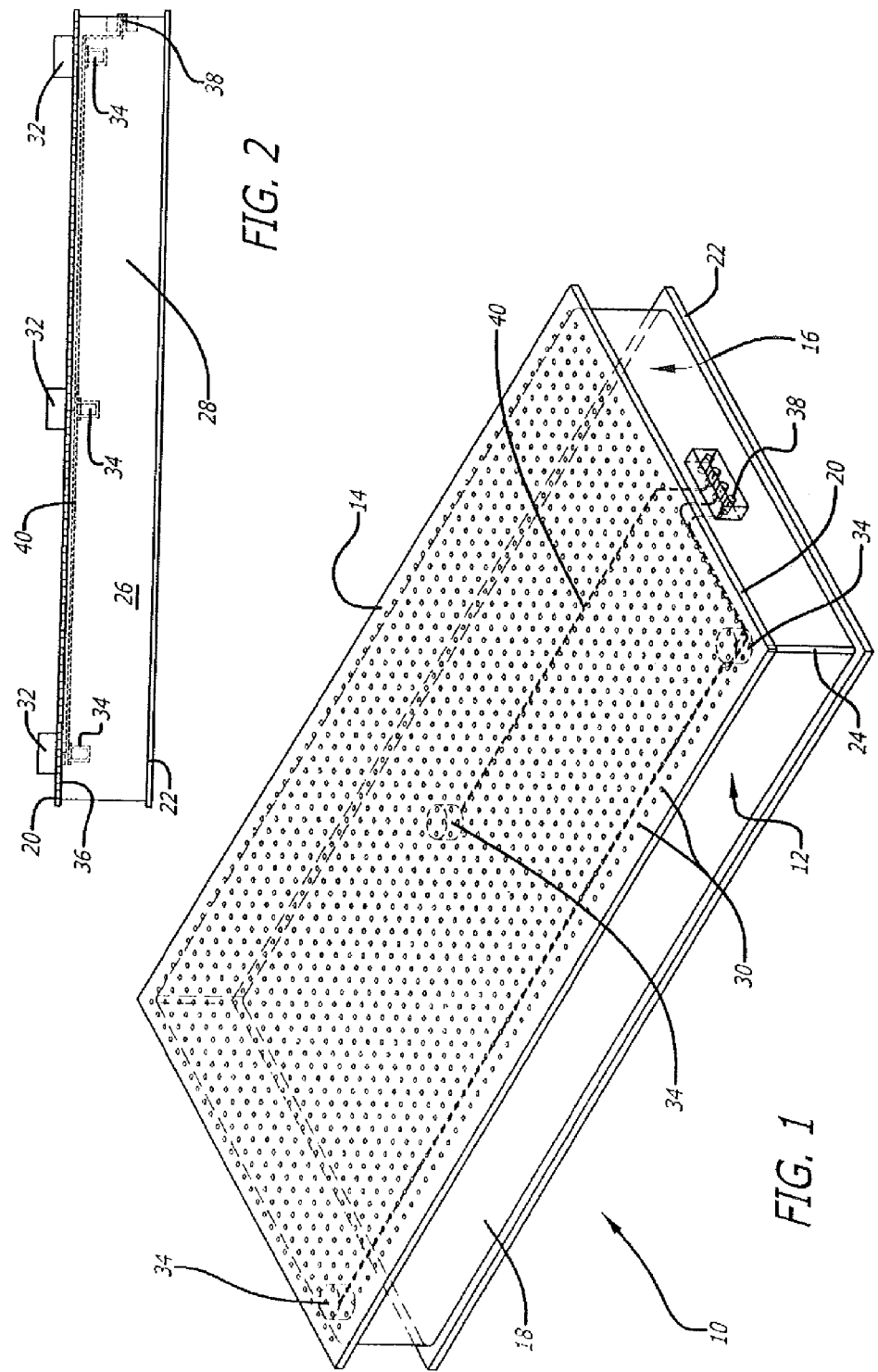

INSTRUMENTED PLATFORM FOR VIBRATION-SENSITIVE EQUIPMENT

CROSS REFERENCE TO A RELATED APPLICATION

The present application is a continuation application of U.S. patent application Ser. No. 13/479,206, filed May 23, 2012, and entitled "Instrumented Platform For Vibration-Sensitive Equipment," which is a continuation of U.S. patent application Ser. No. 11/986,538, filed Nov. 21, 2007, and entitled "Instrumented Platform for Vibration-Sensitive Equipment,", which is a continuation of U.S. Pat. No. 7,320,455, filed Oct. 24, 2003, and entitled "Instrumented Platform for Vibration-Sensitive Equipment," the entire contents of which are both hereby incorporated by reference herein.

BACKGROUND OF THE INVENTION

1. Field of the Invention

The subject matter disclosed generally relates to industrial tables such as optical tables.

2. Background Information

There have been developed various tables for industrial use such as optical bench tables or vibration shaker tables. U.S. Pat. No. 5,154,963 issued to Terry discloses an industrial tabletop that has a top plate, a bottom plate and a honeycomb structure that separates the plates. The honeycomb structure allows for threaded apertures in the top plate. External vibration-sensitive payload devices such as an optical component of an optical system, or a device under test in a shaker system, can be attached to the threaded apertures of the table.

In many experimental research and industrial applications it is desirable to isolate the tabletop from external vibration such as the natural tremor of the building structure. U.S. Pat. No. 6,209,841 issued to Houghton et al. discloses an active isolation module that can be placed between the building floor and a tabletop to dampen tabletop vibration. The isolator includes a vibration sensor and an actuator that are connected to a controller. The sensor senses vibration and provides an output signal to the controller. The controller then processes the output signal and provides a drive signal to excite the actuator and offset the vibration.

The vibration isolators reduce the vibration transmitted to the tabletop from the floor. The tabletop top itself, however, has its own natural frequencies and corresponding flexural vibration modes that can be easily excited by residual vibration coming through the isolators or by other sources such as acoustical excitation, air turbulence and dynamic forces generated by the payload equipment installed on the table. The main flexural vibration modes usually have a global character, which means that an excitation at any point of the tabletop generates a vibration pattern encompassing the whole tabletop surface. Those natural vibrations are very lightly damped and therefore can reach high amplitudes unless special damping means are introduced into the tabletop structure.

Passive dampers of various designs are widely used in construction of optical tables. The "Shock and Vibration Handbook", ed. By C. M. Harris, 4$^{th}$ edition, 1996; 5$^{th}$ edition, 2001, Ch. 37, provides a survey of the state of the art in this field and a classification of dampers (damping treatments). According to it, the known types of damping treatments include:

Free-layer damping treatments, where the energy is dissipated by means of extensional deformation of a damping layer (made of visco-elastic material) induced by flexural vibration of the base structure.

Constrained-layer damping treatments, where the constraining layer helps induce relatively large shear deformations in the visco-elastic layer in response to flexural vibration of the base structure, thereby providing more effective energy dissipation mechanism.

Integral damping treatments, including use of damped laminated sheets and/or damped joints in the construction assembly.

Tuned dampers, which are essentially mass-spring systems having resonances matched (tuned) to the resonance frequency of the base structure. The application of the tuned damper replaces the resonance peak of the base structure, typically, by two peaks of lesser amplitude.

Damping links, i.e., visco-elastic elements joining tow parts of the structure that experience large relative motion in the process of vibration.

Some of cited damping techniques have found applications in optical tables. In particular, Newport Corporation (see "The Newport Resource" catalog by Newport Corporation, 2003) uses tuned dampers, constrained layer treatment of work surfaces and integral damping in its optical tabletop designs.

Nevertheless, the growing demand for high precision and high throughput in optoelectronics and semiconductor industries, as well as the needs of modern scientific experimental instruments, require higher damping performance of optical tables than that achieved by the methods and devices known in the state of the art. Active vibration control means are known to be able to achieve superior performance compared to passive control.

It is sometimes desirable to monitor the vibration level on the table. For example, in a precision measurement system the real-time vibration data could qualify or disqualify a certain measurement. In a precision manufacturing system, the real-time vibration data could indicate an increased probability of a particular manufactured item, such as a semiconductor wafer, being defective. Vibration monitoring is also necessary if the tabletop in question is part of a vibration test setup.

The vibration signal may be used merely to indicate increased vibration levels on the platform during certain periods of time. In this case the vibration sensors can be placed at almost any point of the tabletop because of the global character of main vibration modes; the areas near the corners of the tabletop represent a good place for vibration sensors since these areas are responsive to all typical vibration modes of the tabletop top. In other cases, the exact value of vibration input at a critical vibration-sensitive equipment location is of interest. In this situation the sensors should be placed immediately adjacent to the attachment points of the vibration-sensitive equipment.

Deployment of vibration measurement systems, including sensors and cables, on the working surface of the tabletop would detract from the valuable payload space. It may be impossible to place the sensors near the most vibration-sensitive pieces of equipment due to space restrictions. In a production environment it may be impractical due to required set-up time. Therefore, a system monitoring the vibration of the tabletop while leaving its surface clear and accessible to the user would be very desirable.

The essentials of the optical tabletop design are disclosed in the U.S. Pat. No. 4,621,006, entitled "Honeycomb tabletop manufacture and clean-room compatible honeycomb tables" issued to Terry et al. and U.S. Pat. No. 5,500,269, entitled "Honeycomb tabletop manufacture and clean-room compatible honeycomb tables" issued to Terry. Additional details and variations can be found in U.S. Pat. No. 4,645,171, entitled "Honeycomb tabletop" issued to Heide, U.S. Pat. No. 5,061, 541, entitled "Honeycomb tables" issued to Gertel, U.S. Pat. No. 5,626,157, entitled "Optical table" issued to Galpin et al. and U.S. Pat. No. 5,962,104, entitled "Optical Table" issued to Gertel et al. For an extensive general description of optical honeycomb tables, reference may be made to the 2000 Vibration Control Catalog and 2002-2003 "The Newport Resource" Catalogs by Newport Corporation. Catalogs of TMC, Kinetic Systems and other manufacturers also contain descriptions of optical tabletop designs. Although the main purpose of an optical tabletop is to provide a stabletop platform for vibration-sensitive equipment, none of the designs described in the aforementioned patents and catalogs include a built-in means for monitoring vibration, or a tabletop that includes active vibration control.

BRIEF SUMMARY OF THE INVENTION

A platform that includes a vibration sensor located within an inner core of a table.

BRIEF DESCRIPTION OF THE DRAWINGS

FIG. 1 is a perspective view of a platform;

FIG. 2 is a side sectional view of the platform;

DETAILED DESCRIPTION

Figure 3:
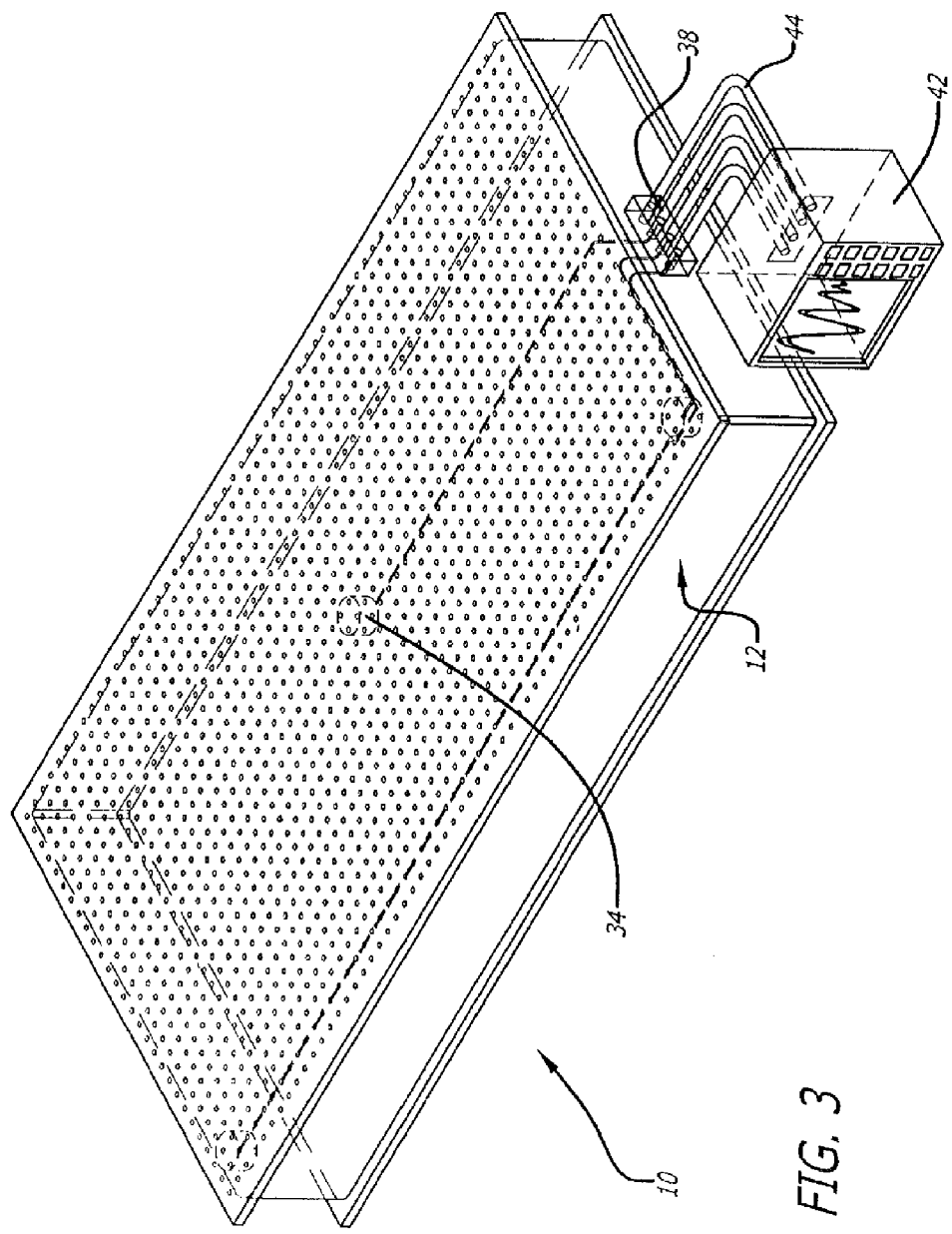
FIG. 3 is a perspective view of the platform coupled to a monitor.

Disclosed is a platform that includes a vibration sensor located within an inner core of a tabletop. The tabletop may have a first plate that supports a vibration-sensitive payload. The first plate may be separated from a second plate by the inner core. The sensor can be located within the core directly below the device. The sensor can be connected to an electrical connector attached to an external surface of the tabletop. A monitor can be readily plugged into the electrical connector to obtain vibration data from the sensor. The platform may also include a damper located within the inner core to reduce vibration of the tabletop. The damper may be an active device that is connected to control circuits located within, or outside, the inner core.

Referring to the drawings more particularly by reference numbers, FIGS. 1 and 2 show a platform 10. The platform 10 may include a tabletop 12 that has a first surface 14, a second surface 16 and a plurality of side surfaces 18. The first surface 14 may extend along a first plate 20, the second surface 16 may extend along a second plate 22 and the side surfaces 18 may extend along one or more side plates 24.

The first plate 20 is separated from the second plate 22 by an inner core 26. The tabletop core 26 may contain a honeycomb structure 28 to provide support for the plates 20 and 22. The first plate 20 may have a plurality of threaded apertures 30. An external vibration-sensitive payload 32 may be attached to one or more threaded apertures 30 of the tabletop 12. The payload 32 can be any type of device such as an optical component of an optical system, a device under test in a shaker machine, etc. Additionally, the tabletop may be a platform for equipment used to fabricate semiconductor wafers, integrated circuits, etc. In general the tabletop 12 may be any platform used to support a component, system or equipment used in manufacturing or laboratory environments. For purposes of claim interpretation the terms "platform" or "tabletop" do not include any structure of an airplane or building, including airplane wings, fuselage, building walls or foundations.

One or more vibration sensors 34 may be located within the inner core 26 and attached to an underlying surface 36 of the first plate 20. The vibration sensor(s) 34 may be any type of device, such as an accelerometer, a geophone or displacement sensor that can sense vibration. Although three vibration sensors 34 are shown, it is to be understood that any number of sensors 34 can be located at any location of the table. The sensor(s) 34 can be connected to an electrical connector 38 attached to one of the side plates 24 of the tabletop 12. The sensor 34 may be connected to the connector 38 by wire cables 40 that run through the inner core 26. The sensor(s) 34 can provide an output signal that is transmitted to the connector 38 over the cables 40.

As shown in FIG. 3, a monitor 42 can be coupled to the sensor(s) 34 by plugging cables 44 into the connector 38. The monitor 42 may record and/or display vibration information provided by the sensor(s) 34. By locating the vibration sensor 34 within the inner core 26, the sensor 34 can measure the vibration directly beneath the external device 32 thereby providing more accurate data. The electrical connector 38 allows the monitor 42 to be readily coupled to the sensor(s) 34 thereby minimizing set-up time for monitoring vibration in the tabletop 12. Although cables 40 and a connector 38 are shown and described, it is to be understood that the sensor(s) 34 may have a wireless transmitter (not shown) that wirelessly transmits the output signal(s).

Figure 4:
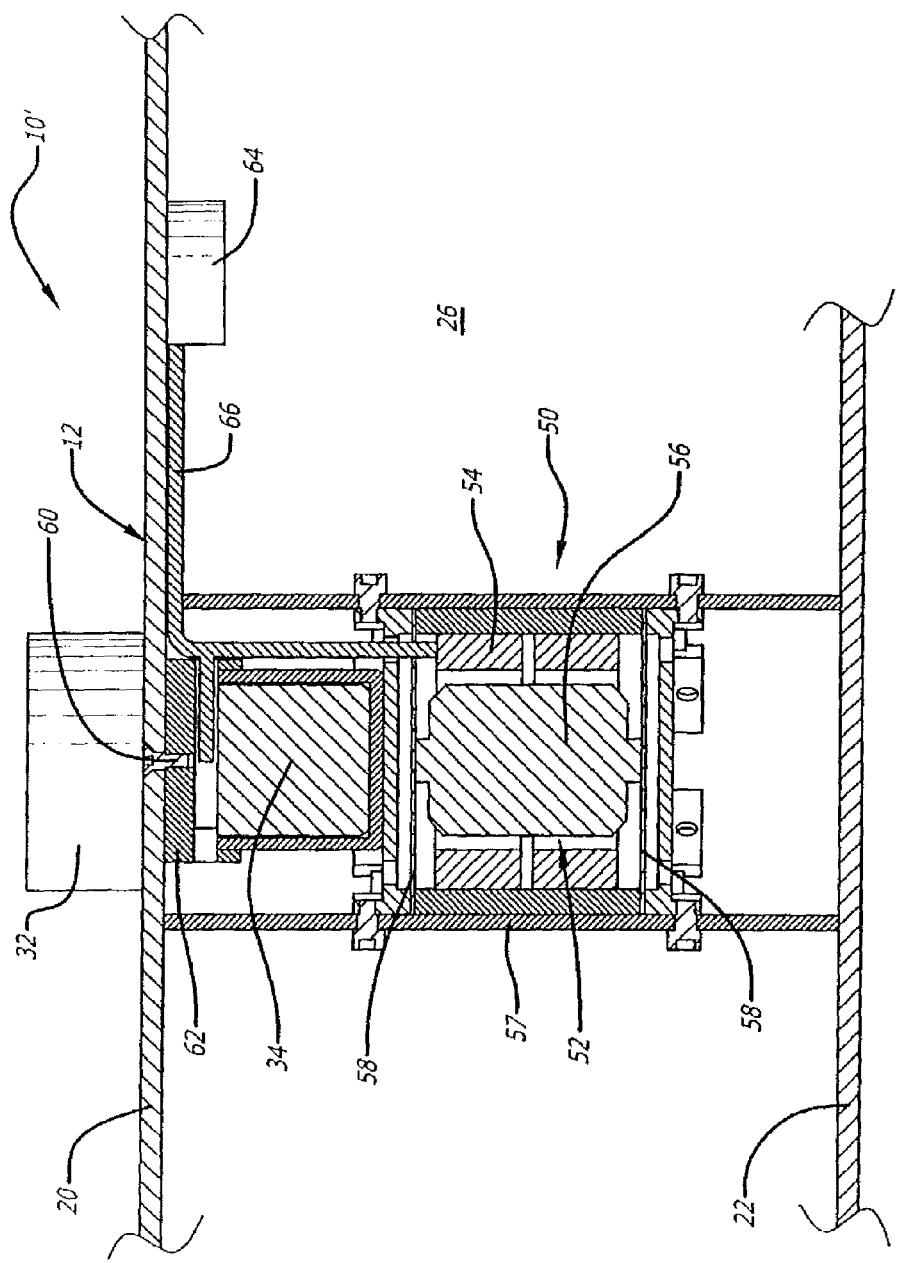
FIG. 4 is a cross-sectional view of an embodiment of platform with a damper in a tabletop core.

FIG. 4 shows an embodiment of a tabletop assembly 10' with a damper 50 located within the inner core 26. The damper 50 may include an actuator 52 such as a voice coil that can be excited to induce a vibration that offsets and cancels the vibration within the tabletop 12. The actuator 52 may include an electrical coil 54 that is magnetically coupled to a magnet mass 56.

The magnet mass 56 may be coupled to an actuator housing 57 by a pair of flexible diaphragms 58. The housing 57 is attached to the plates 20 and 22. That diaphragms 58 function as springs which combine with the mass 56 to form a spring/mass assembly. Providing a current to the coil 54 generates a magnetic force that moves the mass 56. The coil 54 can be excited in a manner to generate, together with the spring/mass assembly, a dynamic force to offset vibration in the tabletop 12.

The vibration sensor 34 can be coupled to the tabletop 12 by a screw 60 that extends through the top plate 20 and is attached to a sensor housing 62. The sensor 60 is preferably coaxial and rigidly coupled to the actuator 52. The sensor 60 provides an output signal to a control circuit 64. The control circuit 64 processes the signal and provides an excitation signal to the coil 54 to generate an offsetting vibration that cancels the table vibration. The control circuit 64 can be located within the inner chamber 26 and connected to the sensor 60 and coil 54 by cables 66.

Figure 5:
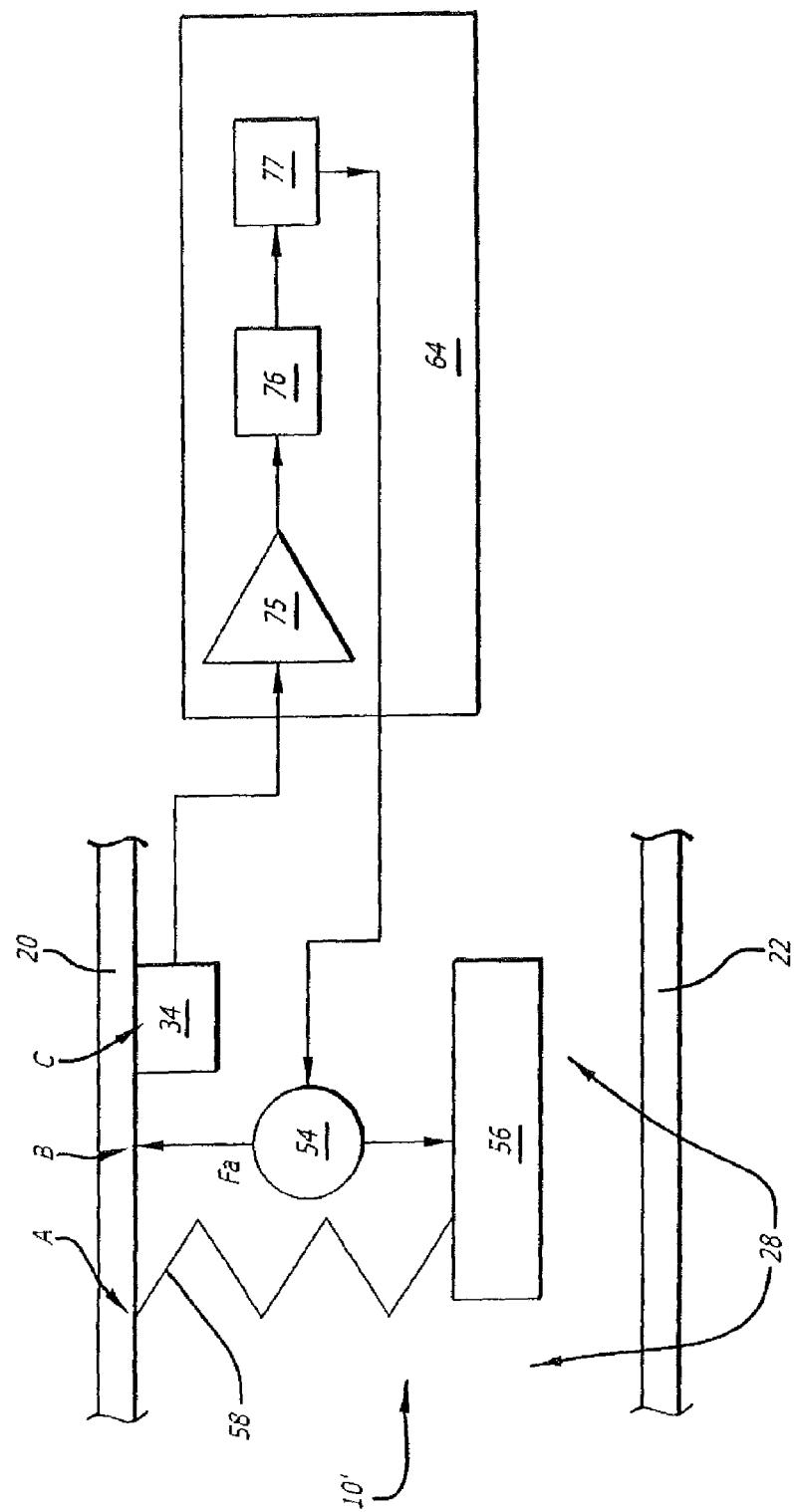
FIG. 5 is a schematic of a controllable damper in the tabletop core.

FIG. 5 is a schematic of a controllable damper integrated into the tabletop 10'. The signal from the vibration sensor 34 is transmitted to the controller 64. The controller 64 may contain amplifiers 75, compensators 76 and filters 77. Digital control or analog control can be employed. The transformed signal is fed into the active element 54, such as a coil, of the actuator incorporated into the platform structure. The vibration actuator may further comprise the reaction mass 56, which may contain magnets, and the flexure 58 that provides elastic coupling between the mass and the tabletop 12. The amplification gains and other parameters of the controller modules are assigned and coordinated with the characteristics of the sensor, actuator and mechanical assembly so that a force $F_a$ induced on the top face sheets of the tabletop 12 reduces the vibration at this point.

As control current flows through the coil 54, the electromagnetic force acts on the reaction mass 56, and the equivalent reaction force is acting on the stationary coils fastened to the platform structure. The control loop is designed so that the phase and the amplitude of the summary force transmitted to the platform structure counteract the vibration of the tabletop 12. Methods for designing controller and actuators for vibration abatement are known in the art.

It is preferred that the locations represented by points A, B and C in FIG. 5 be co-axial on the same vertical axis and rigidly connected. It is also preferable to design the control loop so that the active force acting on the tabletop 12 emulates the effect of a viscous damper in the frequency domain encompassing the main natural frequencies of the flexural vibration of the tabletop 12. This approach creates inherent stability and robustness with respect to the changes in the payload. To implement this strategy, the transfer function of the controller should be designed as:

$$K(\omega) = \frac{-i\omega k}{A(\omega)S(\omega)} \quad (1)$$

Where;

$\omega=2\pi f=$a circular frequency.

$A(\omega)=$the actuator (shaker) transfer function, or ratio of the total force N exerted by the actuator on the structure to input voltage, N/V.

$S(\omega)=$the sensor transfer function, or the ratio of the sensor output voltage to the dynamic displacement, V/m.

$K(\omega)=$the controller transfer function, V/V.

k=an adjustable gain.

As a result, the force exerted by the active system on the table structure will equal $i\omega ku$, where u is the dynamical displacement amplitude of the table, which is equivalent to the action of the viscous damping. Of course, other units can be used. The sensor may be an accelerometer, a velocimeter (such as a geophone) or a displacement sensor. Additional correcting filters may be used to improve the stability margins or other parameters.

Figure 6:
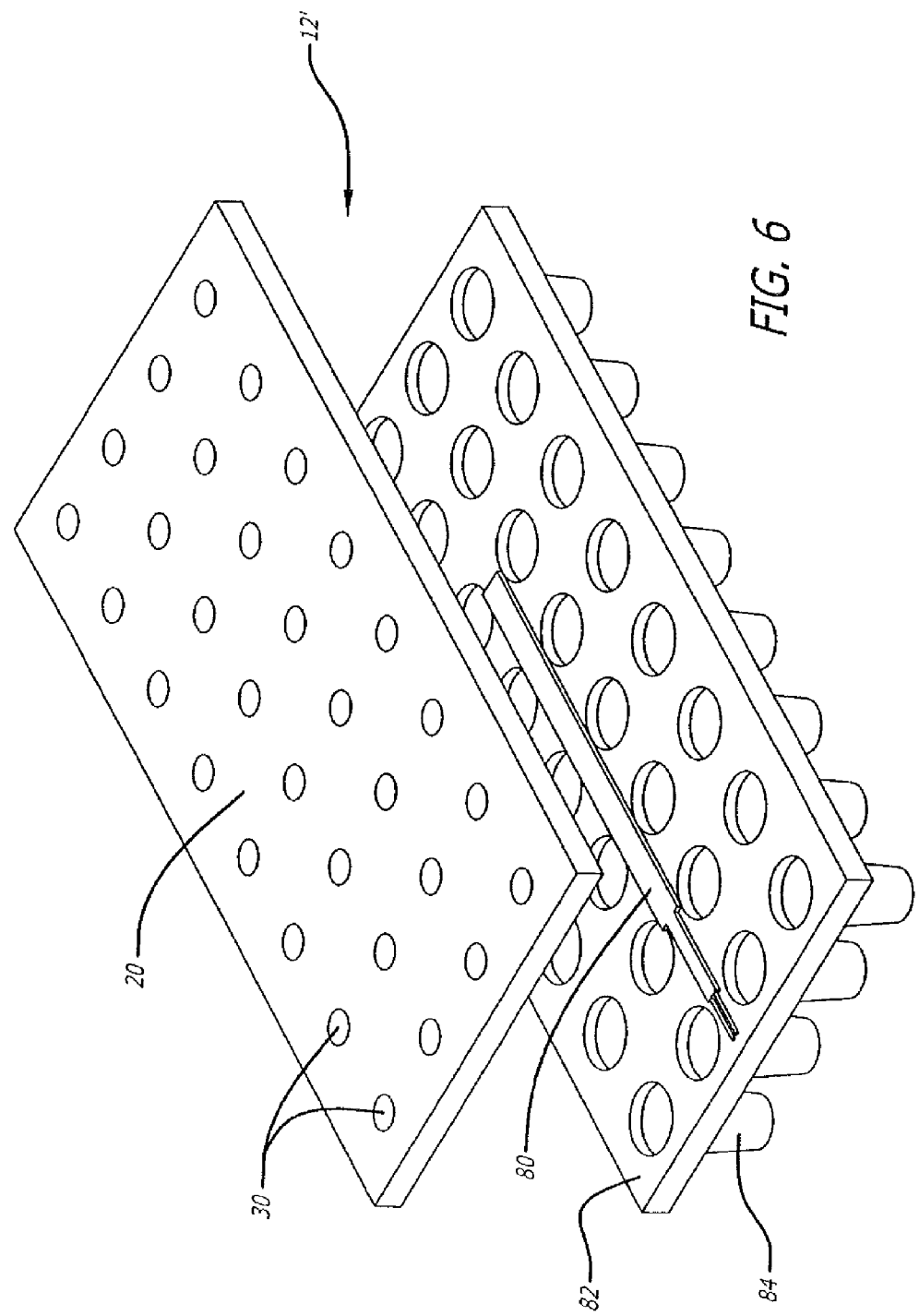
FIG. 6 is a perspective view of an embodiment of the platform.

FIG. 6 shows an alternate embodiment of a tabletop 12 wherein a strip 80 is located between the top plate 20 and a hole sealing tile 82. The hole sealing tile 82 may have a plurality of cups 84 that are located adjacent to the threaded apertures 30 to collect debris that fall through the apertures 30. The strip 80 may be a piezoelectric device that functions as a sensor and/or an actuator. Alternatively, optical cables or other devices may be located between the plate 20 and tile 82 to provide sensing and/or actuating functions. The tile 82 can protect the strip 80 during the manufacturing process of constructing the tabletop 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

In particular, the structure referred to as a platform assembly 10 may be any kind of a support structure, including multi-level platforms or cradle platforms. The working surface of this support structure may be horizontal, vertical or even inclined. Accordingly, the line of action of the sensors and active dampers can be vertical, horizontal or inclined; multidirectional sensors or active dampers are also possible as a modification of this invention. Although FIG. 4 shows an actuator that is implemented as an electromagnetic shaker with a moving magnet and a stationary coil, other types of actuator designs can be used, in particular, electromagnetic designs with stationary magnets and moving coils, electrodynamic designs with one stationary and one moving coil, etc. Alternatively, stiff (e.g. piezoelectric) actuators can be employed to create a relative motion of the reactive mass and the tabletop 12.

What is claimed is:

1. A method for sensing a vibration of a vibration-sensitive payload coupled to a first surface of a platform table, comprising:

positioning one or more vibration sensors and one or more dampers within an inner core of a tabletop, the inner core located between a first surface and second surface of the tabletop;

coupling the vibration sensor and damper with at least one control circuit in communication with the vibration sensor and damper;

sensing a vibration of the first surface of the tabletop with the vibration sensors located within the inner core of a tabletop, wherein the vibration sensor is configured to generate at least one vibration output signal in response to a vibration of the tabletop;

processing the vibration output signal from the vibration sensor with the control circuit, the control circuit configured to generate an excitation signal configured to cancel the vibration of the tabletop with the control circuit in response to the vibration output signal; and controllably actuating the damper with the excitation signal form the control circuit to cancel the vibration of the tabletop.

2. The method of claim 1, further comprising wirelessly transmitting the vibration output signal from the vibration sensor to the control circuit.

3. The method of claim 1, further comprising transmitting the vibration output signal from the vibration sensor to the control circuit via at least one cable.

4. The method of claim 1, further comprising transmitting the vibration output signal from the vibration sensor to at least one external monitor.

5. The method of claim 1, wherein the first surface of the tabletop is damped with at least one active actuator located within the inner core of the tabletop.

6. The method of claim 5, wherein the active actuator creates an active force that emulates an effect of a viscous damper in a frequency domain that encompasses a plurality of natural frequencies of a flexural vibration of the first surface of the tabletop.

* * * * *